United States Patent Office 2,895,937
Patented July 21, 1959

2,895,937

PROCESS FOR HEAT TREATING BUTYL RUBBER WITH AN AROMATIC NITROSO COMPOUND AND PRODUCT OBTAINED

Francis P. Baldwin, Colonia, and Samuel B. Robison, Roselle, N.J., assignors to Esso Research and Engineering Company, a corporation of Delaware No Drawing. Application June 17, 1955
Serial No. 516,313

14 Claims. (Cl. 260—41.5)

This invention relates to a novel rubber reaction product and methods of preparing and using same. More particularly it relates to reaction of rubbers with a nitroso aromatic compound containing at least one functional substituent other than a nitroso group, preferably a substituent less reactive than nitroso. Illustrations of the invention are the reaction of Butyl rubber with paranitrosophenol or with m-nitrosobenzaldehyde.

Butyl rubber, which had been known commercially under the designation GR–I for many years, and now is available under the trade name Enjay Butyl, is exemplified by a high molecular weight copolymer of, for instance, 97–99% of isobutylene and 1–3% isoprene, and is a vulcanizable low unsaturation synthetic rubber having an iodine number in the range of 0.5 to 50, generally about 1 to 20. Products of this type may be made as described in Patent 2,356,128, namely by copolymerization of an isoolefin, preferably of 4 to 6 carbon atoms, e.g. isobutylene, methyl-2-butene-1, and the like, with a minor proportion of a conjugated multiolefin of 4 to 14 carbon atoms, preferably a diolefin of 4 to 6 carbon atoms, e.g. butadiene, isoprene, piperylene, 2-methylpentadiene, dimethylbutadiene, etc. This copolymerization is carried out at a temperature substantially below 0° C., preferably below —50° C., e.g. about —80° C. as maintained by solidified carbon dioxide as refrigerant, or even better —103° C. as maintained by liquefied ethylene as refrigerant. The catalyst should be a dissolved Friedel-Crafts catalyst such as AlCl$_3$ dissolved in methyl chloride or other halogen-substituted alkane which does not polymerize under conditions used. Other known Friedel-Crafts catalysts may be used such as BF$_3$, AlBr$_3$, SnCl$_4$, TiCl$_4$, ZrCl$_4$, etc., as well as various Friedel-Crafts complexes containing solubilizing hydrocarbon or alkoxy groups, or ether or other promoting groups, as known in this art. The polymerization is preferably carried out in the presence of about 0.5 to 20.0, preferably about 1 to 5, volumes of inert diluent, such as methyl chloride, ethyl chloride, ethylene, etc. or a material which is not only a diluent for the reactants but also a solvent for the resulting polymer, e.g. butane, heptane, etc.

The resulting Butyl rubber, which should have a Staudinger molecular weight of at least about 20,000, and preferably in the range of 30,000 to 100,000 or higher, may be recovered by any of the known recovery processes such as the wet finishing technique involving discharging the polymerization reaction liquid into a hot aqueous flash tank, then filtering and drying the polymer, or by so-called dry finishing involving flashing off solvent and unreacted raw materials without contacting with water or aqueous solutions.

Butyl rubber made by such process has been available commercially for a number of years and has found great utility in the manufacture of certain products such as automobile inner tubes, and in some respects is substantially superior to natural rubber or any of the high unsaturation synthetic rubbers such as diene-styrene, diene-nitrile, polychloroprene, etc., because the low unsaturation of the Butyl rubber makes the product, both before and after vulcanization, much more resistant to oxidation and attack by chemical agents than the above-mentioned rubbery materials which have a high unsaturation on the order of 300 to 400 iodine number.

However, the Butyl rubber, probably inherently due to its low unsaturation, has not thus heretofore shown as great a degree of reinforcement or interaction with commonly used fillers such as carbon black, silica, etc., as do the high unsaturation rubbers.

According to the present invention, it has now been discovered that the Butyl rubber can be tremendously improved in filler-reinforcement properties if it is first subjected to reaction with small amounts such as 0.1 to 5.0%, preferably 0.5 to 3.0%, by weight of a mono- or polynuclear aromatic nitroso compound containing at least one other functional nuclear substituent, preferably containing a polar element of the group: O, N and halogen, with or without additional non-functional substituents.

One of the preferred species of modifying agents is an hydroxy-substituted mononitroso aromatic compound. These reagents are preferably nitrosophenolic type compounds having the empirical formula HO—Ar—NO, in which Ar represents an aromatic ring, which may be a benzene or naphthalene ring, etc., or lower alkyl homologs thereof containing 1 or more methyl, ethyl, etc. groups. Specific examples of such materials include the preferred compound paranitrosophenol, as well as para-nitroso derivatives of other phenolic compounds, e.g. cresol, xylenol, isopropyl phenol, ethyl phenol, etc. and 1,4-nitrosonaphthol, or other compounds such as those coming under the following graphical empirical formula:

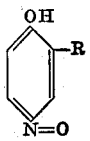

or

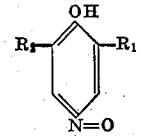

where R, R$_1$ and R$_2$ may be H, alkyl or aryl.

Also, o- and m-compounds may be used, e.g. o-nitroso cresol (nitrosated o-cresol), nitrosated o-hydroxy diphenyl, etc. Esters of any of these various compounds may be used, such as the benzoate ester of p-nitrosophenol. Mixtures thereof may also be used.

Other classes of modifiers or reactants may be used, preferably coming within the scope of the general formula

ONArM$_m$Y in which Ar is a mono- or polynuclear aromatic hydrocarbon nucleus with or without inert substituents, M is an aliphatic divalent hydrocarbon group, either saturated as in the formula C$_n$H$_{2n}$ or slightly unsaturated as in C$_n$H$_{2n-2}$, where $n$ may be an integer of 1 to 5 or 10 or higher, $m$ is 0 or an integer, e.g. 1 to 10 or higher, and Y may be any one or more of the following groups:

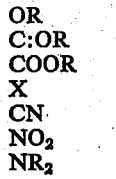
OR
C:OR
COOR
X
CN
NO$_2$
NR$_2$ in which R is hydrogen or a monovalent hydrocarbon radical, e.g. alkyl, aryl, aralkyl, alkaryl, cycloalkyl, and X is halogen. Any of these above-listed groups may contain relatively inert hydrocarbon groups in intermediate position, between the first and last elements of these groups.

Thus, in case the empirical formula is ONArOR, some specific examples include the nitrosophenol type compounds described hereinabove, and corresponding ether derivatives thereof such as p-nitrosophenyl methyl ether, m-nitrosophenyl cyclohexyl ether.

If such compounds contain an intermediate group $M_m$, several species include p-nitroso benzyl alcohol, nitrosobenzyl ethyl ether.

If the empirical formula used is ONArCOR, some examples included are m-nitrosobenzaldehyde, p-nitrosophenyl ethyl ketone, or aldehyde derivatives such as $ONC_6H_4$, $CH_2CHO$, $ONC_6H_3(CH_3)C_4H_6CHO$, etc.

If the empirical formula is ONArCOOR, examples include p-nitrosobenzoic acid, and corresponding ethyl, methyl and other esters.

The simpler formula ONArX includes species such as p-nitrosochlorbenzene, o,p-nitrosodichlorbenzene, and corresponding bromine or other halogen derivatives.

When Y is a nitrile or cyano (—CN) group, specific examples will include p-nitroso cyanobenzene, -toluene, -naphthalene, etc.

Within the scope of the empirical formula $ONArNO_2$ are examples such as p-nitrosonitrobenzene, m-nitrosonitrobenzene, nitrosonitrotoluene, nitrosonitronaphthalene, etc.

The general formula $ONArNR_2$ includes, when R is hydrogen, species such as p-nitrosoaniline, -toluidine, -xylidine, etc., and when R is an alkyl or other hydrocarbon group, examples such as p-nitroso dimethyl aniline, m-nitroso diethyl aniline, etc. Other related, substituted amine groups NHCOR, $NHCH_2COOR$, etc.

Homologs of any of the above-mentioned classes and species of compounds may be used in which the aromatic nucleus may have one or more other substituents of a non-functional character such as methyl or other alkyl, aryl, aralkyl, etc. groups.

Normally, it is preferred to use nitroso aromatic compounds containing only one other functional nuclear substituent, preferably less reactive than the nitroso group, but it may be desirable for specific purposes to use nitrosoaromatic compounds containing two or even more other functional groups of the various types listed hereinabove, as for instance, nitrosoresorcinol, nitrososalicylic acid, nitrosohydroxy anisole, etc.

This reaction of the nitrosoaromatic compounds with Butyl rubber may be carried out in several ways such as by adding the desired amount of paranitrosophenol or other equivalent reagent onto a batch of Butyl rubber being mixed on a conventional rubber mixing mill, or in a Banbury or other suitable equipment. The actual mixing may be accomplished on a cold mill, but in order to obtain the desired reaction the temperature of the mixture is preferably maintained at about 250–350° F. inversely for a period of time ranging from about 20 minutes to 1 minute. Preferred temperature range is about 260 to 310° F. The preferred time of heating is generally from 2 to 15 minutes at 310° F. and at lower temperatures the time would be approximately that derived by multiplication of the above limits by a factor of 1.5 to 2 for each 10° C. decrease in temperature.

One particularly desirable method of accomplishing the reaction of the nitrosophenolic or equivalent compound with the Butyl rubber is to continuously feed the desired proportion of phenolic compound into an extruder in which Butyl rubber is being continuously fed into one end, mixed, and extruded at the other end, such extruder being maintained at the desired temperature for effecting the reaction with the nitrosophenolic compound.

It is found that the resulting nitrosopolyfunctional aromatic-Butyl rubber reaction product which has pendant functional polar, but non-crosslinking, groups attached to it, now is susceptible to great improvements in tensile strength, modulus characteristics, and stress-strain relationships, when cured, particularly when compounded with various plasticizers and/or conventional rubber fillers such as various types of carbon black including channel black, furnace black, thermal black, as well as other strictly inorganic fillers such as the various silicas, aluminas, etc. with which the modified Butyl develops a new type of affinity or bonding. Improvements are reflected not only in the above physical measurements but also in the dynamic properties (loss factor and percent relative damping), ozone resistance, electrical resistivity, solution and compatibility with other types of rubbers, resins, solvents, etc., adhesion to tire cord, cloth, metal, paper, etc., and other properties, etc. The attached polar groups also permit a new type of vulcanization or curing not dependent upon, but supplemental to, the ordinary curing with sulfur and accelerators, or dinitrosobenzene or quinone dioxime cure.

Although the mechanism of the chemical reactions involved in the present invention is not known with certainty, it is believed that under the reaction conditions used, the polyfunctional modifier is attached to the Butyl polymer chain without substantial loss of unsaturation.

Although it is believed that this invention is particularly applicable to Butyl rubber due to its low unsaturation, the invention may also be applied, with various degrees of benefit, to higher unsaturation synthetic rubbers, such as a special type of high unsaturation isobutylene-diolefin Friedel-Crafts copolymer having an iodine number in the range of about 55 to 175, disclosed in Patent 2,607,764, and even to natural rubber or synthetic rubbers having a high unsaturation in the range of 300 to 400 iodine number, such as those mentioned in the earlier part of the specification. In the case of GR-S (butadiene-styrene rubbery copolymer) or other synthetic rubbers having some cross-linking, or having a tendency to cross-link, probably due to the presence of 20% or more of side vinyl groups, the amount of nitrosophenolic compound to be used should be kept low, e.g. 0.1 to 1.0%, preferably 0.2 to 0.7%, based on the amount of rubber.

The details and advantages of the invention will be better understood from a consideration of the following experimental data.

EXAMPLE 1

1 gram of p-nitrosophenol was mixed on a cold mill with 30 grams of GR-I-25 isobutylene-isoprene copolymer (8 minute Mooney of 40–50 at 212° F., and a mole percent unsaturation of about 1.9 to 2.3, corresponding to an iodine number of about 13 to 15.5). The mill was then heated and the mixture milled for 10 minutes at 300–310° F. The mill was then cooled and the polymer compounded according to the following recipe:

| | |
|---|---|
| GR-I-25 reaction product | 100.00 |
| Zinc oxide | 5.00 |
| Stearic acid | 1.00 |
| Sulfur | 2.00 |
| Tellurac [1] | 1.00 |
| Kosmobile 66 [2] | 50.00 |

[1] Tellurium diethyldithiocarbamate.
[2] Medium processing channel black.

Specimens were then molded and the following inspections obtained:

STRESS-STRAIN DATA FOR 75′/300° F. CURE

| Percent elongation: | Stress, p.s.i. |
|---|---|
| 0 | 0 |
| 100 | 490 |
| 200 | 1,475 |
| 300 | 2,680 |
| 320 | 2,850 |

YERZLEY OSCILLOGRAPH DATA FOR 45′/307° F. CURE

Dynamic modulus, $8.175 \times 10^7$ dyne cm.$^{-1}$
Loss factor ($\eta f$), $1.565 \times 10^6$ poises sec.$^{-1}$
Percent relative damping, 17.28

The above properties are vastly superior to those exhibited by a conventional Butyl mix.

EXAMPLE 2

2 grams of p-nitrosophenol were mixed on a cool mill with 100 grams of GR–I–17 (Mooney about 60 to 70, mole percent unsaturation about 1.4 to 1.8, corresponding to an iodine number of about 9.5 to 12.5). About ⅔ of this was then milled hot for 10 minutes at 260–280° F. This reaction product was then split into two parts which were compounded as follows:

| | |
|---|---:|
| GR–I–17 reaction product | 100.00 |
| Zinc oxide | 5.00 |
| Stearic acid | 0.50 |
| Hi-Sil C (silica) | 40.00 |
| Sulfur | 2.00 |
| Tellurac | 1.00 |
| B.J.F. (3 anilinomethyl-2(3)-benzothiazolethione) | 1.00 |

The above compound gave the following inspections:

STRESS-STRAIN DATA FOR 75′/300° F. CURE

| Percent elongation: | Stress, p.s.i. |
|---|---:|
| 0 | 0 |
| 100 | 220 |
| 200 | 665 |
| 300 | 1,445 |
| 400 | 2,280 |
| 500 | 3,000 |
| 590 | 3,585 |

YERZLEY OSCILLOGRAPH DATA FOR 45′/307° F. CURE

Dynamic modulus, $5.868 \times 10^7$ dyne cm.$^{-2}$
Loss factor ($\eta f$), $1.063 \times 10^6$ poises sec.$^{-1}$
Percent relative damping, 13.51

This compound showed that 92.3% of the polymer was bound to the pigment (run by cyclohexane extraction of specimen).

The above data are of extreme interest and importance, especially in view of the fact that a normal Butyl mix with this pigment shows the usual properties attending mineral filled compounds, i.e., low modulus @ 300% elongation, high loss factor and relative damping, low tensile strength. Hence, here we have for the chemically modified Butyl the long sought after mineral pigment which gives properties equivalent to carbon black. This may be readily perceived by comparison of the above stress-strain data with those obtained with the carbon black compound described below.

| | |
|---|---:|
| GR–I–17 reaction product | 100.00 |
| Zinc oxide | 5.00 |
| Stearic acid | 0.50 |
| Tellurac | 1.00 |
| Sulfur | 2.00 |
| Kosmobile 66 | 50.00 |

STRESS-STRAIN DATA FOR 75′/300° F. CURES

| Percent elongation: | Stress, p.s.i. |
|---|---:|
| 0 | 0 |
| 100 | 250 |
| 200 | 655 |
| 300 | 1,440 |
| 400 | 2,310 |
| 500 | 3,250 |
| 600 | 3,875 |

This compound showed 78.5% bound polymer as compared to 8–12% found in unmodified Butyl compounds.

EXAMPLE 3

A GR–I–17-p-nitrosophenol reaction product was prepared as in Example 2 and compounded as follows:

| | |
|---|---:|
| GR–I–17 reaction product | 100.00 |
| Zinc oxide | 5.00 |
| Stearic acid | 2.00 |
| Sulfur | 2.00 |
| Tellurac | 1.00 |
| Alon C (alumina) | 90.00 |

When cured for 75′/300° F. this compound gave the following inspections.

Tensile, 2570
Modulus @ 300%, 540
Elongation, 730

This represents a distinct improvement over untreated Butyl rubber mixed compounds containing this filler.

EXAMPLE 4.—EFFECT OF p-NITROSOPHENOL CONCENTRATION ON CHANNEL BLACK COMPOUNDS

A series of six compositions were made up in which GR–I–17 was treated with various amounts ranging from 0 to 2 parts by weight per 100, of p-nitrosophenol, using a 33% concentrate of p-nitrosophenol in Whitetex clay. The compounding ingredients and results are shown below.

| | Parts by wt. |
|---|---:|
| Treated GR–I–17 [1] | 100 |
| Carbon black (MPC) | 50 |
| Stearic acid | 1 |
| Zinc oxide | 5 |
| Sulfur | 2 |
| Tetramethyl thiuram disulfide | 1 |
| Benzothiazyl disulfide | 1 |

[1] Treated with amount shown below of a 33% p-nitrosophenol/67% Whitetex clay mixture, by mixing the GR–I–17 and nitrosophenol on cool mill, then hot milling 10 min. at 310° F., followed by compounding with other materials listed above.

The compositions vulcanized at 307° F. were tested, with the results shown below. These data indicate that compared to the untreated Butyl rubber (GR–I–17), the product which had been reacted with various amounts of p-nitrosophenol, all showed a very large increase in modulus at 300% and greatly improved resilience, as indicated particularly by the lower loss factor. It is especially remarkable that these surprisingly beneficial results are obtained with even as little as 0.1 part by weight of p-nitrosophenol (i.e. 0.3 part of the ⅓ concentrate in clay).

Table I

| Nitroso-phenol reagent [1] | Cured (min.) | Tens. | Mod. at 300% | Elong. | Loss factor (poises sec.$^{-1}$ $\times 10^{-6}$) | Dynamic modulus (dyne cm.$^2$ $\times 10^{-7}$) |
|---|---|---|---|---|---|---|
| 0 | 30 | 3,125 | 775 | 690 | 3.8 | 8.4 |
| | 60 | 3,150 | 1,050 | 640 | | |
| | 120 | 3,150 | 1,275 | 580 | | |
| 0.3 | 30 | 3,230 | 1,150 | 640 | 2.8 | 7.8 |
| | 60 | 3,150 | 1,300 | 600 | | |
| | 120 | 3,275 | 1,550 | 550 | | |
| 0.75 | 30 | 3,225 | 1,350 | 580 | 2.8 | 7.9 |
| | 60 | 2,900 | 1,700 | 490 | | |
| | 120 | 3,000 | 1,800 | 480 | | |
| 1.5 | 30 | 3,200 | 1,450 | 560 | 2.4 | 7.3 |
| | 60 | 3,100 | 1,600 | 530 | | |
| | 120 | 3,000 | 1,650 | 510 | | |
| 3 | 30 | 3,100 | 1,150 | 640 | 2.5 | 7.6 |
| | 60 | 3,000 | 1,375 | 560 | | |
| | 120 | 3,000 | 1,500 | 540 | | |
| 6 | 30 | 2,950 | 1,100 | 610 | 2.9 | 7.8 |
| | 60 | 3,000 | 1,300 | 570 | | |
| | 120 | 1,950 | 1,450 | 540 | | |

[1] Parts by weight of p-nitrosophenol/clay mixture used for treating 100 parts of GR–I–17.

EXAMPLE 5.—EFFECT OF p-NITROSOPHENOL ON D.C. RESISTIVITY

In order to test the D.C. electrical resistivity, a compounding recipe similar to that used in Example 4 was used, except that the Butyl rubber used was a GR–I–15 (both untreated and reacted with p-nitrosophenol), and the amount of stearic acid used was only 0.5 instead of 1.0. In Example 5, the Butyl rubber, stearic acid and p-nitrosophenol (were used) were mixed on a cool mill, and then hot milled 20 minutes at 265° F. Then the rest of the compounding ingredients were added and the compositions were cured for 60 minutes at 307° F., and the products were tested for physical properties and D.C. resistivity, with the following results:

Table II

| Nitrosophenol (parts/100 GR-I-15) | Tens. | Mod. at 300% | Elong. | D.C. resistivity (ohm-cm.) |
|---|---|---|---|---|
| 0 | 2,650 | 1,080 | 585 | $4.59 \times 10^7$ |
| 1 | 2,650 | 1,380 | 525 | $1.05 \times 10^{11}$ |
| 1 [1] | 2,600 | 1,775 | 425 | $3.22 \times 10^{11}$ |

[1] Black added on cool mill, then mixture hot milled 5'/265° F.

The above data in Table II show that this invention results in a 10,000 fold improvement in resistivity compared to exactly similar Butyl rubber composition containing butyl rubber which has not been reacted with p-nitrosophenol. The data in the last line of Table II show the further improvement in modulus at 300% effected by the added hot milling of the carbon black and the treated Butyl rubber (1775 modulus compared to 1380 without the added hot milling, and compared to 1030 for the untreated Butyl rubber).

EXAMPLE 6.—EFFECT OF TYPE OF CARBON BLACK

The following set of 8 tests shows the results obtained when applying the present invention to Butyl rubber compositions containing 4 different types of carbon black, in each case comparing the results of the treated Butyl rubber with a control of untreated Butyl rubber. The general compounding recipe used was the same as shown in Example 4. The treated Butyl rubber compositions contained 3 parts by weight of the same 33% concentrate of p-nitrosophenol-Whitex clay as were used in Example 4, this mixture being added to 100 parts of GR–I–17 on a cool mill and then hot milled for 10 minutes at 310° F. In all of the 8 tests, the GI–I (treated or untreated) was mixed with the carbon black and stearic acid on a cool mill and then hot milled for 5 minutes at 310° F. Then the rest of the compounding ingredients were added on a cool mill and the finished composition was then vulcanized at 307° F. and tested, the results being as shown herebelow in Table III.

Table III

COARSE THERMAL BLACK

| Cured min. at 307° F. | Untreated GR-I-17 | | | Treated GR-I-17 | | |
|---|---|---|---|---|---|---|
| | Tens. | Mod. at 300% | Elong. | Tens. | Mod. at 300% | Elong. |
| 30 | 750 | 450 | 530 | 1,200 | 825 | 450 |
| 60 | 615 | 490 | 410 | 1,025 | 900 | 340 |
| 120 | 600 | 500 | 400 | 1,025 | 900 | 340 |
| Oscil. data (65'/307° F.) loss factor (poise sec.$^{-1}$ × 10$^{-6}$) | | 0.97 | | | 0.75 | |
| Dynamic modulus (dyne cm.$^{-2}$ × 10$^{-7}$) | | 6.51 | | | 6.78 | |

SEMI-REINFORCING FURNACE BLACK

| | | | | | | |
|---|---|---|---|---|---|---|
| 30 | 1,750 | 800 | 580 | 2,150 | 1,500 | 460 |
| 60 | 1,500 | 1,000 | 460 | 2,050 | 1,600 | 390 |
| 120 | 1,400 | 1,000 | 430 | 1,950 | 1,650 | 370 |
| Loss factor (poise sec.$^{-1}$ × 10$^{-6}$) | | 2.42 | | | 1.08 | |
| Dynamic modulus (dyne cm.$^{-2}$ × 10$^{-7}$) | | 10.58 | | | 7.63 | |

HIGH MODULUS FURNACE BLACK

| | | | | | | |
|---|---|---|---|---|---|---|
| 30 | 1,800 | 1,300 | 490 | 2,300 | 1,840 | 410 |
| 60 | 1,850 | 1,550 | 400 | 2,225 | 1,950 | 350 |
| 120 | 1,850 | 1,650 | 360 | 2,125 | 2,025 | 330 |
| Loss factor (poise sec.$^{-1}$ × 10$^{-6}$) | | 5.57 | | | 2.18 | |
| Dynamic modulus (dyne cm.$^{-2}$ × 10$^{-7}$) | | 21.4 | | | 11.6 | |

HIGH ABRASION FURNACE BLACK

| | | | | | | |
|---|---|---|---|---|---|---|
| 30 | 2,350 | 1,400 | 500 | 2,825 | 2,025 | 440 |
| 60 | 2,475 | 1,700 | 430 | 2,650 | 2,150 | 370 |
| 120 | 2,500 | 1,875 | 420 | 2,725 | 2,300 | 370 |
| Loss factor (poise sec.$^{-1}$ × 10$^{-6}$) | | 5.22 | | | 2.80 | |
| Dynamic modulus (dyne cm.$^{-2}$ × 10$^{-7}$) | | 20.2 | | | 12.7 | |

The above data in Table III show that in the case of each of the four types of carbon black, the nitrosophenol-treated Butyl rubber (GR–I–17) has obtained an improved tensile strength, a substantially better modulus at 300%, and a much improved resilience (lower loss factor) compared to similar compositions prepared with the same type of carbon black but with untreated Butyl rubber.

EXAMPLE 7.—OTHER NITROSOPHENOLIC COMPOUNDS

The following tests are given to show how the invention may be applied by reacting Butyl rubber with nitrosophenolic compounds other than p-nitrosophenol. In addition to data on an untreated Butyl rubber (GR–I–17), comparative data are given on 0.5, 1.0 and 2.0% of nitrosated o-cresol, and on 0.5 and 1.0% of nitrosated o-hydroxy diphenyl, and on 0.5% of benzoate ester of p-nitrosophenol. The general compounding recipe used in these tests was the same as that in Example 4, in each case using 50 parts of medium processing channel black as the filler. The procedure used was to first mix the GR–I–17 on a cool mill, add the nitrosophenolic compound, until thoroughly mixed on the cool mill, then hot milling for 10 minutes at 310° F., then adding the carbon black and stearic acid on the cool mill, and hot milling for 5 minutes at 310° F., followed by final addition of the other compounding ingredients on the cool mill, and then vulcanizing and testing the compositions. The results are given in Table IV.

Table IV

NITROSATED O-CRESOL

| Amount of nitrosated phenolic compound | Min. cure | Tens. | Mod. at 300% | Elong. | Oscillograph data on 65'/307° F. cure | |
|---|---|---|---|---|---|---|
| | | | | | Loss factor, poises (sec.$^{-1}$ × 10$^{-6}$) | Dynamic modulus, dyne (cm.$^{-2}$ × 10$^{7}$) |
| 0 | 30 | 3,150 | 925 | 650 | 4.6 | 10 |
| | 60 | 3,250 | 1,175 | 580 | | |
| | 120 | 3,250 | 1,275 | 570 | | |
| 0.5 | 30 | 3,450 | 1,375 | 600 | 2.5 | 7.7 |
| | 60 | 3,225 | 1,425 | 530 | | |
| | 120 | 3,425 | 1,550 | 520 | | |
| 1 | 30 | 3,350 | 1,425 | 590 | 2.4 | 7.8 |
| | 60 | 3,050 | 1,675 | 500 | | |
| | 120 | 3,200 | 1,875 | 470 | | |
| 2 | 30 | 3,350 | 1,400 | 605 | 2.5 | 7.7 |
| | 60 | 3,000 | 1,625 | 500 | | |
| | 120 | 3,150 | 1,600 | 500 | | |

NITROSATED O-HYDROXY DIPHENYL

| | | | | | | |
|---|---|---|---|---|---|---|
| 0.5 | 30 | 3,150 | 1,175 | 590 | 2.2 | 6.8 |
| | 60 | 3,075 | 1,475 | 520 | | |
| | 120 | 2,925 | 1,425 | 530 | | |
| 1 | 30 | 3,150 | 1,300 | 580 | 2.3 | 7.2 |
| | 60 | 2,850 | 1,350 | 500 | | |
| | 120 | 2,950 | 1,500 | 500 | | |

BENZOATE ESTER OF P-NITROSOPHENOL

| | | | | | | |
|---|---|---|---|---|---|---|
| 0.5 | 30 | 2,900 | 1,150 | 610 | 3.0 | 7.5 |
| | 60 | 2,800 | 1,400 | 520 | | |
| | 120 | 2,775 | 1,575 | 480 | | |

The data in Table IV show that all three of the nitrosophenolic compounds tested give a substantially increased 300% modulus compared to that obtained with the untreated Butyl rubber control, the results obtained with the nitrosated o-cresol being somewhat better than those obtained with the nitrosated o-hydroxy diphenyl and the benzoate ester of p-nitrosophenol. The data in Table IV also show a substantially improved resilience (lower loss factor) compared to the untreated Butyl rubber composition. In the resiliency property, the data obtained with the nitrosated o-hydroxy diphenyl were slightly superior to those obtained with the nitrosated o-cresol and with the benzoate ester of p-nitrosophenol.

EXAMPLE 8.—EFFECT OF NITROSATED O-CRESOL ON SILICA-COMPOUNDED BUTYL RUBBER COMPOSITIONS

The following series of tests is given to show the improvements obtained by reacting a Butyl rubber (GR–I–17) with concentrations ranging from 0 to 2 parts per 100, of nitrosated o-cresol, and mixing the resulting product with a silica filler, specifically Hi-Sil C, in the following recipe:

Parts by wt.
GR–I–17 _____ 100
Nitrosated o-cresol (as shown below) _____ 0–2
Hi-Sil C (silica) _____ 40
Stearic acid _____ 2
Zinc oxide _____ 5
Sulfur _____ 2
Tellurium diethyldithiocarbamate _____ 1
B.J.F. (3 anilinomethyl-2(3)-benzothiazolethione) _ 1

The procedure used was to mix the nitrosated o-cresol with the GR–I–17 on the cool mill and then hot mill the mixture for 10 minutes at 310° F., then add the Hi-Sil C and stearic acid on the cool mill, and hot mill for 5 minutes at 310° F., followed by addition of the remaining compounding ingredients on the cool mill, and finally curing at 307° F., and testing the cured products, with the results shown below in Table V.

*Table V*

| Amount of nitrosated o-cresol | Min. cure | Tens. | Mod. at 300% | Elong. | Loss factor, poises (sec.⁻¹× 10⁻⁶) | Dynamic modulus, dyne (cm.⁻²× 10⁷) |
|---|---|---|---|---|---|---|
| 0 | 30 | 2,100 | 300 | 680 | 1.2 | 5.3 |
| | 60 | 1,750 | 375 | 590 | | |
| | 120 | 1,900 | 425 | 580 | | |
| 0.5 | 30 | 2,600 | 550 | 650 | 1.1 | 5.7 |
| | 60 | 2,450 | 725 | 600 | | |
| | 120 | 2,400 | 700 | 600 | | |
| 1 | 30 | 2,625 | 625 | 650 | 0.93 | 5.7 |
| | 60 | 2,400 | 750 | 590 | | |
| | 120 | 2,200 | 875 | 540 | | |
| 2 | 30 | 2,650 | 600 | 680 | 1.1 | 5.6 |
| | 60 | 2,400 | 800 | 595 | | |
| | 120 | 2,400 | 925 | 540 | | |

The data in Table V show that all three concentrations of 0.5, 1.0 and 2.0 parts per 100 of the nitrosated o-cresol convert the GR–I–17 Butyl rubber into a product capable of very substantial reinforcement with a silica type filler. The treated Butyl rubber compositions showed a tremendous increase in 300% modulus and in tensile strength compared to the untreated Butyl rubber control composition. Even though the control already had a relatively low loss factor, the treated Butyl rubber gave even better resilience.

EXAMPLE 9.—EFFECT OF p-NITROSOPHENOL ON NATURAL RUBBER COMPOUNDS

The following four experiments show the effect of various concentrations ranging from 0 to 4 parts of p-nitrosophenol on 100 parts by weight of Hevea smoked sheet rubber, when reacted together and compounded according to the following recipe:

Parts by wt.
Smoked sheet (Hevea) _____ 100
Stearic acid _____ 2
p-Nitrosophenol, as shown below _____ 0–4
Carbon black (MPC) _____ 50
Zinc oxide _____ 5
Sulfur _____ 2.5
Mercaptobenzothiazole _____ 1
Phenyl-beta-naphthylamine _____ 1

The procedure used was to mix the smoked sheet rubber, the stearic acid and the p-nitrosophenol (when used) on a cool mill and then hot mill the mixture for 10 minutes at 310° F. Then the carbon black was added and mixed on the mill at about 155° F. (to prevent breakdown of the rubber), and then milled for 5 minutes at 310° F., followed by addition of the remaining compounding ingredients on the mill at about 155° F. The compositions were then cured at 287° F. and tested for resiliency properties, with the results shown herebelow in Table VI.

*Table VI*

| Amount of p-nitrosophenol | Oscillograph data on 65'/287° F. cure | |
|---|---|---|
| | Loss factor (poises sec.⁻¹×10⁻⁶) | Dynamic modulus (dyne cm.⁻²×10⁻⁷) |
| 0 | 2.23 | 7.1 |
| 1 | 1.90 | 4.7 |
| 2 | 1.52 | 4.8 |
| 4 | 1.27 | 5.7 |

The above data in Table VI show that the reaction of natural rubber with p-nitrosophenol effects a very substantial improvement in the resiliency (low loss factor). The loss factor of 2.23 for the untreated rubber is decreased successively to 1.90, 1.52, and 1.27 by concentrations of 1, 2 and 4 parts of p-nitrosophenol per 100 of rubber, respectively.

EXAMPLE 10.—EFFECT OF p-NITROSOPHENOL ON GR–S COMPOUND

When GR–S (butadiene-styrene) synthetic rubber is substituted in place of the Hevea smoked sheet rubber in the recipe used in Example 9, the following results are obtained: The GR–S control, and the GR–S reacted with 1 part of p-nitrosophenol per 100 of GR–S, could both be mixed and compounded satisfactorily; but the mixtures containing 2 and 4 parts per 100, of p-nitrosophenol, though handling satisfactorily on the cool mill for mixing, and also for the hot milling for 10 minutes at 310° F., they were too highly crosslinked for proper mixing when the 50 parts of carbon black was added. The untreated GR–S control and the reaction product of GR–S with 1 part per 100, of p-nitrosophenol, were cured for 50 minutes at 287° F. and tested, with the following results:

*Table VII*

UNTREATED GR-S

| Amount of p-nitro-sophenol | Tens. | Mod. at 300% | Elong. | Oscillograph data on 65'/287° F. cure | |
|---|---|---|---|---|---|
| | | | | Loss factor, poises (sec.$^{-1} \times 10^{-6}$) | Dynamic modulus, dyne (cm.$^{-2} \times 10^{-7}$) |
| 0 | 2,850 | 1,400 | 480 | 6.0 | 10.4 |

TREATED GR-S

| 1 | 1,900 | | 190 | 4.5 | 12.2 |

The data in above Table VII show that the reaction of 1 part of p-nitrosophenol with 100 parts of GR-S synthetic rubber effects a substantial improvement in resilience of the products, as indicated by a reduction in the loss factor from 6.0 to 4.5. This example indicates that higher concentrations of p-nitrosophenol effect too much cross-linking of this type of synthetic rubber, perhaps due to the presence of a substantial amount of side vinyl groups resulting from the butadiene in this type of synthetic rubber. From these data, it would appear that lower concentrations such as 0.1 to 1% of p-nitrosophenol are satisfactory for reacting with GR-S synthetic rubber.

EXAMPLE 11.—ENJAY BUTYL 325 TREATED WITH 0.32 TO 1.3% MODIFIER

A sample of Enjay Butyl 325, which has an 8 minute Mooney of 41 to 49 and unsaturation of 1.5 to 1.9%, was reacted with four different amounts ranging from 0.32 to 1.3%, of p-nitrosophenol, and then mixed with carbon black (15 parts Philblack-O and 35 parts Kosmobile-66 per 100 of Butyl polymer), and curing agents (zinc oxide 5, sulfur 2, and Tellurac 1), vulcanized 40 minutes at 307° F., and tested for physical and dynamic properties, along with an unmodified control for comparison. The results obtained are shown in the following table:

*Table VIII*

| | 1 | 2 | 3 | 4 | 5 |
|---|---|---|---|---|---|
| Percent p-nitrosophenol | 0.0 | 0.32 | 0.65 | 0.97 | 1.3 |
| Mooney viscosity—LR—4' at 212° F. | 45 | 47 | 46 | 46 | 47 |
| Polymer | | | | | 100 |
| Philblack-O | | | | | 15 |
| Kosmobile-66 | | | | | 35 |
| Mixing: Cooling water on black (3A Banbury) incorporated after 4-5 minutes. Total mixing time—10 minutes. | | | | | |
| Discharge temp. (° F.) | 320 | 340 | 340 | 330 | 335 |
| Mooney viscosity—LR—4' at 212° F.: | | | | | |
| Stacked cool | 81 | 86 | 87 | 87 | 86 |
| Stacked hot | 81 | 92 | 103 | 100 | 88 |
| Vulc. 40' at 307° F.: | | | | | |
| Modulus, 100%, p.s.i. | 380 | 500 | 500 | 480 | 500 |
| Modulus, 200%, p.s.i. | 850 | 1,380 | 1,380 | 1,400 | 1,380 |
| Modulus, 300%, p.s.i. | 1,380 | 2,310 | 2,300 | 2,350 | 2,300 |
| Tensile, p.s.i. | 2,640 | 2,540 | 2,570 | 2,620 | 2,580 |
| Elong., percent | 465 | 330 | 335 | 325 | 340 |
| Dynamic Properties, 122° F.: | | | | | |
| $\eta f \times 10^{-6}$, poise $\times$ cps | 3.85 | 2.06 | 2.13 | 2.15 | 1.99 |
| $K \times 10^{-7}$, dynes/cm.$^{-2}$ | 8.66 | 7.70 | 7.96 | 8.04 | 7.65 |

The above data show that the reaction of the Butyl rubber with p-nitrosophenol before compounding and curing, produced a tremendous increase in modulus in the cured compositions, e.g. gave a 200% modulus of 1380 to 1400 compared to 850 for the unmodified control, and a 300% modulus of 2300 to 2350 compared to 1380 for the unmodified control, and also giving a great reduction in internal viscosity from 3.85 for the control down to 1.99 to 2.15 for the modified Butyl compositions.

EXAMPLE 12.—COMPOSITIONS LIKE EXAMPLE 11, BUT CONTAINING OIL PLASTICIZER

Another series of tests was made quite similar to those of Example 11 except that in each case some hydrocarbon oil plasticizer was used in the composition when compounded and cured.

The results obtained are shown in the following table.

*Table IX*

| | No heat treatment | | | | |
|---|---|---|---|---|---|
| | 1 | 2 | 3 | 4 | 5 |
| Percent modifier (p-nitrosophenol) | 0.0 | 0.32 | 0.65 | 0.97 | 1.3 |
| Kosmobile-66 | 35 | 35 | 35 | 35 | 35 |
| Philblack-O | 15 | 15 | 15 | 15 | 15 |
| Coray-230 [1] | 20 | 20 | 20 | 20 | 20 |
| Faxam-40 [2] | | | | | |
| Vulc. 40' at 307° F. [a]: | | | | | |
| Modulus, 100%, p.s.i. | 100 | 125 | 120 | 100 | 130 |
| Modulus, 200%, p.s.i. | 240 | 450 | 450 | 475 | 465 |
| Modulus, 300%, p.s.i. | 580 | 1,060 | 1,050 | 1,060 | 1,045 |
| Tensile, p.s.i. | 2,460 | 2,340 | 2,200 | 2,260 | 2,265 |
| Elong., percent | 745 | 550 | 520 | 530 | 540 |
| Dynamic properties, 122° F.: | | | | | |
| $\eta f \times 10^{-6}$, poise $\times$ cps | 1.94 | 1.10 | 1.28 | 1.15 | 1.21 |
| $K \times 10^{-7}$, dynes/cm.$^{-2}$ | 4.70 | 4.21 | 4.51 | 4.51 | 4.62 |

[1] Naphthenic lubricating oil base stock having a viscosity of about 230 sec. Saybolt at 210° F.
[2] Paraffinic lubricating oil base stock having a viscosity of about 40 sec. Saybolt at 210° F.
[a] Full compound for control: Zinc oxide 5, sulfur 2, Tuads 1, Altax 1, for compounds 1-5 acceleration is changed to 1 part of Tellurac.

The above data show that p-nitrosophenol-modified Butyl rubber (samples 2-5) gave almost double the modulus values (200% and 300% moduli) of the unmodified control test 1, and gave much lower internal viscosity values of 1.1 to 1.28, compared to 1.94 for the unmodified control test 1. These data show that without heat treatment of the Butyl rubber with carbon black, the modification of the Butyl rubber with 0.32 to 1.3% p-nitrosophenol gives substantially as great improvement in modulus and internal viscosity as is obtained by heat treatment of an unmodified Butyl rubber with carbon black, as shown in test 6 for comparison.

EXAMPLE 13.—ADHESION OF PLASTICIZED MODIFIED BUTYL TO RAYON TIRE CORD

The same type of Butyl rubber used in Examples 11 and 12 was similarly modified with various amounts ranging from 0 to 1.3% of p-nitrosophenol, as in Examples 11 and 12, and then compounded with various amounts ranging from 0 to 20 parts of hydrocarbon oil plasticizer per 100 of Butyl polymer, and then all samples were compounded with carbon black and curing agents according to the following recipe:

Polymer _____ 100
Kosmobile-66 _____ 50
Philblack-O _____ 15
Zinc oxide _____ 5
Sulfur _____ 2
Tellurac _____ 1

These samples were then tested for adhesion to rayon tire cords which had been pretreated with 5% solution of resorcinol formaldehyde resin (using a molar ratio of formaldehyde to resorcinol of 5:1 and using 2% of NaOH as catalyst based on resorcinol resin solids, and the solution allowed to age 24 hours at room temperature prior to use), and the dipped cords dried 5 minutes at 250° F.

The results of the adhesion tests are shown in the following table:

Table X

| | 1 | 2 | 3 | 4 | 5 |
|---|---|---|---|---|---|
| Percent modifier (p-nitrosophenol) | 0.0 | 0.32 | 0.65 | 0.97 | 1.3 |
| | H—adhesion 20″/min.; R.T. | | | | |
| Plasticizer Coray 230: | | | | | |
| 0 parts | 10 | 17.5 | 19.1 | 18.7 | 19.3 |
| 6 parts | | 18.5 | 17.8 | 18.7 | 19.3 |
| 12 parts | | 18.9 | 20.6 | 19.1 | 18.3 |
| 20 parts | | 19.0 | 17.8 | 19.3 | 19.0 |

These data show that the control sample 1 of unmodified Butyl rubber gave an adhesion of only 10, without any oil plasticizer, whereas the Butyl rubber which had been modified with 0.32 to 1.3% of p-nitrosophenol gave adhesion values ranging from about 17 to 21, either without plasticizer or with from 6 to 20 parts of oil plasticizer. This is a remarkable improvement considering the relatively small amount of chemical reagents used to modify the Butyl rubber.

EXAMPLES 14 AND 15.—BUTYL RUBBER MODIFIED WITH m-NITROSOBENZALDEHYDE

The Butyl rubber of the type used in Example 2 was modified by mixing 42 parts by weight of Butyl rubber with 0.95 parts by weight of m-nitrosobenzaldehyde and hot milling this mixture for 20 minutes at 250-260° F. This modified butyl was then compounded and cured in duplicate samples except that one part of p-phenylene diamine was used to obtain some additional curing by crosslinking of the modified Butyl polymer molecules. The samples were then cured at 287° F. for periods ranging from 10 to 60 minutes, and the cured samples were tested for physical properties, with the results shown in the following table:

Table XI

| | 1 | 2 |
|---|---|---|
| Modified butyl | 100 | 100 |
| Zinc oxide | 5 | 5 |
| Stearic acid | 1 | 1 |
| Kosmobile-66 | 50 | 50 |
| Sulfur | 2 | 2 |
| Tellurac | 1 | 1 |
| p-Phenylene diamine | | 1 |
| | Tensile-mod. at 300-elong. | Tensile-mod. at 300-elong. |
| Cure: | | |
| 10′/287° F | | 1,840–1,680–360 |
| 15′/287° F | 1,530–670–590 | 2,140–2,140–300 |
| 30′/287° F | | 2,530– –295 |
| 60′/287° F | 2,370–1,530–490 | |

These data show that in the case of test 1 (without the use of p-phenylene diamine), the Butyl rubber which had been modified with m-nitrosobenzaldehyde gave a 300% modulus of 1530 (at 60 minutes' cure) which is surprisingly high compared to the substantially corresponding figure of 1050 obtained with an unmodified butyl control in Example 4. The above tests also show that the additional use of p-phenylene diamine in the curing compound produces an even stronger and faster cure to a 300% modulus of 1680 after only a 10 minute cure and 2140 at 15 minutes' cure. Thus the p-phenylene diamine is so reactive with the m-nitrosobenzaldehyde-modified Butyl rubber that it would not be necessary to use as much as 1 part of p-phenylene diamine per 100 of modified Butyl polymer. For instance, 0.1 to 0.5 part would be sufficient under the conditions of the above tests, to obtain a substantial acceleration of the curing and increase of the modulus, without substantial reduction in percent elongation.

Other tests show that p-nitrosodimethylaniline, m-nitrosobenzaldehyde, p-nitrosochlorbenzene, and p-nitrosobenzoic acid all react with Butyl rubber substantially like p-nitrosophenol does.

This application is a continuation-in-part of Serial No. 445,466, filed July 23, 1954, and Serial No. 457,794, filed September 22, 1954.

It is not intended that this invention be limited to the specific examples of materials and reaction conditions which have been given hereinabove for sake of illustration, but only by the appended claims in which it is intended to claim all novelty inherent in the invention as well as all modifications coming within the scope and spirit of the invention.

We claim:

1. A process which comprises reacting in the substantial absence of curatives at a temperature level between about 250° and 350° F. for between about one to twenty minutes with a vulcanizable rubber selected from the group consisting of rubbery isoolefin-multiolefin copolymers, butadiene-styrene copolymers, and natural rubber; about 0.1 to 5.0 percent by weight of an aromatic nitroso compound containing at least one other reactive substituent less reactive than nitroso, said compound having the empirical formula $ONArM_mY$, in which Ar is selected from the group consisting of mono- and polynuclear aromatic hydrocarbon nuclei, M being an aliphatic divalent hydrocarbon group having a formula selected from the group consisting of $C_nH_{2n}$ and $C_nH_{2n-2}$, $n$ being an integer of between about one to ten, $m$ being between about 0 and 10; Y being selected from the group consisting of OR, C=OR, COOR, X, CN, $NO_2$ and $NR_2$ in which R is selected from the group consisting of hydrogen, alkyl, aryl, aralkyl, alkaryl and cycloalkyl, X being halogen; mixing and milling at said temperature level in the substantial absence of curatives at least one filler with the reaction product formed, and subsequently vulcanizing the resulting composition in the presence of added curatives whereby a vulcanizate having an improved modulus and resistivity is produced.

2. Product comprising a cured shaped mixture of curatives with a hot-milled mixture of at least one filler selected from the group consisting of carbon blacks, silicas, aluminas, and mixtures thereof, with a vulcanizable rubber selected from the group consisting of rubbery isoolefin-multiolefin copolymers, butadiene-styrene copolymers, and natural rubber, which has been heat-modified at about 250 to 350° F. for about 1 to 20 minutes in the absence of curatives by about 0.1 to 5.0% by weight of an aromatic nitroso compound containing at least one other reactive substituent less reactive than nitroso, said compound having the empirical formula $ONArM_mY$, in which Ar is selected from the group consisting of mono- and polynuclear aromatic hydrocarbon nuclei, M being an aliphatic divalent hydrocarbon group having a formula selected from the group consisting of $C_nH_{2n}$ and $C_nH_{2n-2}$, $n$ being an integer of between about one to ten, $m$ being between about 0 and 10; Y being selected from the group consisting of OR, C=OR, COOR, X, CN, $NO_2$ and $NR_2$ in which R is selected from the group consisting of hydrogen, alkyl, aryl, aralkyl, alkaryl and cycloalkyl, X being halogen.

3. Product comprising a cured shaped mixture of curatives with a hot-milled mixture of a filler selected from the group consisting of carbon blacks, silicas, aluminas, and mixtures thereof, with an isobutylene-isoprene Butyl rubber of about 1 to 20 iodine number, which has been heat-modified at about 250 to 350° F. for about 1 to 20 minutes in the absence of curatives by about 0.1 to 5.0% of a nitroso phenol.

4. A process which comprises reacting in the substantial absence of curatives at a temperature level between about 250° and 350° F. for between about one and twenty minutes with a vulcanizable rubber selected from the group consisting of rubbery isoolefin-multiolefin copolymers, butadiene-styrene copolymers, and natural rubber; about 0.1 to 5.0 percent by weight of a nitrosophenol, mixing and milling in the substantial absence of curatives at least one filler with the reaction product formed at said temperature level, and subsequently vulcanizing the resulting composition in the presence of added curatives whereby a vulcanizate having an improved modulus and resistivity is produced.

5. A process which comprises reacting in the substantial absence of curatives at a temperature level between about 250° and 350° F. for between about one and twenty minutes with a vulcanizable rubber selected from the group consisting of rubbery isoolefin-multiolefin copolymers, butadiene-styrene copolymers, and natural rubber; about 0.1 to 5.0 percent by weight of an N-substituted p-nitroso aniline, mixing and milling in the substantial absence of curatives at least one filler with the reaction product formed at said temperature level, and subsequently vulcanizing the resulting composition in the presence of added curatives whereby a vulcanizate having an improved modulus and resistivity is produced.

6. A process which comprises reacting in the substantial absence of curatives at a temperature level between about 250° and 350° F. for between about one and twenty minutes with a vulcanizable rubber selected from the group consisting of rubbery isoolefin-multiolefin copolymers, butadiene-styrene copolymers, and natural rubber; about 0.1 to 5.0 percent by weight of a nitrosobenzaldehyde, mixing and milling in the substantial absence of curatives at least one filler with the reaction product formed at said temperature level, and subsequently vulcanizing the resulting composition in the presence of added curatives whereby a vulcanizate having an improved modulus and resistivity is produced.

7. A process which comprises reacting in the substantial absence of curatives at a temperature level between about 250° and 350° F. for between about one and twenty minutes with a vulcanizable rubber selected from the group consisting of rubbery isoolefin-multiolefin copolymers, butadiene-styrene copolymers, and natural rubber, about 0.1 to 5.0 percent by weight of an aromatic nitroso compound containing a nitroso group attached directly to the aromatic nucleus and also containing attached directly to the aromatic nucleus at least one functional polar but non-crosslinking substituent other than nitroso and containing at least one member selected from the group consisting of oxygen, nitrogen and halogen, mixing and milling in the substantial absence of curatives at least one filler with the reaction product formed at said temperature level, and subsequently vulcanizing the resulting composition in the presence of added curatives whereby a vulcanizate having an improved modulus and resistivity is produced.

8. Process according to claim 7 in which the rubber is a copolymer of $C_4$ to $C_6$ isoolefin and a $C_4$ to $C_{14}$ multiolefin.

9. Process according to claim 7 in which the filler is selected from the group consisting of carbon blacks, silicas, aluminas, and mixtures thereof.

10. A process which comprises reacting in the substantial absence of added curatives at a temperature level between about 250° and 350° F. for between about one to twenty minutes with an isoolefin-multiolefin Butyl rubber having an iodine number of about 1 to 50, about 0.1 to 5.0 percent by weight of an aromatic nitroso compound containing a nitroso group attached directly to the aromatic nucleus and also containing attached directly to the aromatic nucleus at least one functional polar but non-crosslinking substituent other than nitroso and containing at least one member selected from the group consisting of oxygen, nitrogen and halogen, mixing and milling at said temperature level in the substantial absence of curatives at least one filler with the reaction product formed and subsequently vulcanizing the resulting composition in the presence of added curatives whereby a vulcanizate having an improved modulus and resistivity is produced.

11. A process which comprises reacting in the substantial absence of added curatives at a temperature level between about 250° and 350° F. for between about 1 to 20 minutes with an isoolefin-multiolefin Butyl rubber having an iodine number of about 1 to 50, about 0.1 to 5.0 percent by weight of a p-nitroso N-alkyl aniline, mixing and milling at said temperature level in the substantial absence of curatives at least one filler with the reaction product formed and subsequently vulcanizing the resulting composition in the presence of added curatives whereby a vulcanizate having an improved modulus and resistivity is produced.

12. A process which comprises reacting a vulcanizable unsaturated rubber containing polymerized multiolefin in the substantial absence of curatives at a temperature level between about 250 and 350° F. for about 1 to 20 minutes with about 0.1 to 5.0 percent by weight of an aromatic nitroso compound containing a nitroso group attached directly to the aromatic nucleus and also containing attached directly to the aromatic nucleus at least one functional polar but non-crosslinking substituent other than nitroso and containing at least one member selected from the group consisting of oxygen, nitrogen and halogen, and subsequently mixing the resulting composition with curatives, shaping and vulcanizing.

13. Product comprising a cured shaped mixture of curatives with a vulcanizable unsaturated rubber containing polymerized multiolefin which has been heat-modified at about 250 to 350° F. for about 1 to 20 minutes in the absence of curing agents by about 0.1 to 5.0% of an aromatic nitroso compound containing a nitroso group attached directly to the aromatic nucleus and also containing attached directly to the aromatic nucleus at least one functional polar but non-crosslinking substituent other than nitroso and containing at least one member selected from the group consisting of oxygen, nitrogen and halogen.

14. Product comprising a cured shaped mixture of curatives with an isobutylene-multiolefin Butyl rubber having an iodine number of about 1 to 50 which has been heat-modified at about 250 to 350° F. for about 1 to 20 minutes in the absence of curatives by about 0.1 to 5.0% by weight of an aromatic nitroso compound containing a nitroso group attached directly to the aromatic nucleus and also containing attached directly to the aromatic nucleus at least one functional polar but non-crosslinking substituent other than nitroso and containing at least one member selected from the group consisting of oxygen, nitrogen and halogen.

References Cited in the file of this patent

UNITED STATES PATENTS

| | | |
|---|---|---|
| 2,035,698 | Fisher | Mar. 31, 1936 |
| 2,393,321 | Haworth | Jan. 22, 1946 |
| 2,477,015 | Sturgis et al. | July 26, 1949 |
| 2,702,286 | Iknayan et al. | Feb. 15, 1955 |